Jan. 10, 1967 H. D. CRANE ET AL 3,298,002

MAGNETIC CORE CIRCUIT ARRANGEMENT

Filed Oct. 5, 1962 2 Sheets-Sheet 1

INVENTORS
HEWITT D. CRANE
EDWARD C. DOWLING

BY

Curtis, Morris and Safford
ATTORNEYS

Jan. 10, 1967 H. D. CRANE ET AL 3,298,002

MAGNETIC CORE CIRCUIT ARRANGEMENT

Filed Oct. 5, 1962 2 Sheets-Sheet 2

INVENTORS
HEWITT D. CRANE
EDWARD C. DOWLING

BY

Curtis, Morris and Safford
ATTORNEYS

United States Patent Office 3,298,002
Patented Jan. 10, 1967

3,298,002
MAGNETIC CORE CIRCUIT ARRANGEMENT

Hewitt D. Crane, Palo Alto, Calif., and Edward C. Dowling, Harrisburg, Pa., assignors to AMP Incorporated, Harrisburg, Pa.

Filed Oct. 5, 1962, Ser. No. 228,557
7 Claims. (Cl. 340—174)

This invention relates to the wiring of a magnetic core circuit, such as a shift register.

An object of the invention is to provide an improved wiring and layout arrangement for a magnetic core circuit.

Another object is to provide a magnetic core circuit which is more efficient in its operation and yet simpler and less expensive to manufacture.

A more specific object is to provide an improved way of wiring the core-to-core coupling loops in a magnetic core circuit.

These and other objects will in part be understood from and in part pointed out in the description given hereinafter.

In U.S. Patent No. 2,995,731 there is disclosed a shift register employing multi-aperture magnetic cores (MAD's) and connecting wire only as the circuit elements. In this general type of shift register, the cores are in the forms of toroids with a large central aperture and with additional minor apertures at various points around the body of the toroid. These cores are about the size of a small shirt button and the minor apertures are not much larger than the size of a needle. Accordingly, a considerable problem is presented in passing the necessary wires through the various ones of the apertures of the cores. The present invention among other things provides a simplified wiring arrangement.

In accordance with the present invention in one specific embodiment thereof, the cores of a shift register are physically positioned in staggered relation in even and odd columns, as described in the above mentioned patent. Mounted closely above the cores along the center line between them is a heavy buss wire to which are attached at properly spaced intervals in "pig-tail" fashion short lengths of wire. Each of these wires during assembly of the unit is threaded between a transmitting aperture of a respective core in one column and the receiving aperture of the next core in the other column, the free end of the wire being returned and soldered to the buss next to the initially attached end of the wire. These wires, and the short lengths of the buss between their ends, therefore become the coupling loops for the magnetic cores. Now since the wires are all initially attached to the buss at one of their ends, and since their lengths and spacings can be very precisely controlled, the finally completed coupling loops are very accurate in resistance and uniform in configuration. Furthermore, this arrangement considerably simplifies and makes more nearly fool-proof the wiring of such a magnetic core circuit.

In a second embodiment of the invention, this "pig-tail" wiring technique is somewhat extended and advantageously applied in connecting together the magnetic cores of one circuit with those of another circuit. Here the main buss is in the form of a flat sheet of copper with short tabs extending on either side. Additionally, auxiliary busses of flat copper sheet, together with short lengths of fine wire, are utilized to complete the necessary coupling loops, which if made throughout of plain wire in accordance with usual practice, would be inoperative.

A better understanding of the invention, together with a fuller appreciation of its many advantages will best be gained from the following description given in connection with the accompanying drawings wherein.

Figure 1:
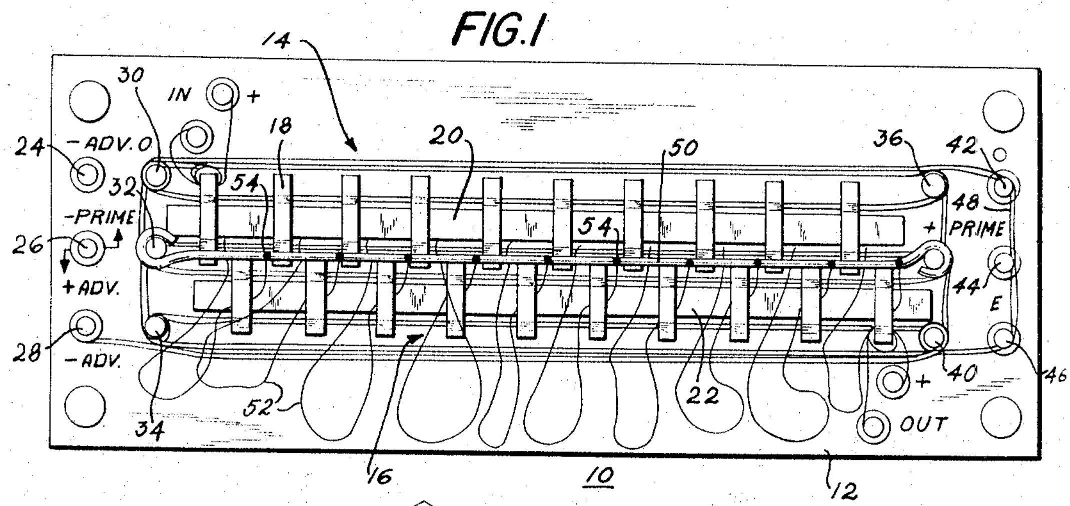
FIGURE 1 is a top view of a MAD core shift register with still incomplete "pig-tail" coupling loops attached to a common buss, in accordance with the invention.

The unit 10 shown in FIGURE 1 is a shift register of the general type described in the aforesaid U.S. patent. This unit includes an insulating base board 12 on which are mounted two parallel and somewhat interleaved columns 14 and 16 of multi-aperture cores 18. Column 14 will be designated the O (odd numbered) cores and column 16 the E (even numbered) cores. Each core is mounted on edge and projects through a corresponding transverse slot in board 12. Each column of cores is aligned and held in place by a respective one of the flat insulating strips 20 and 22 glued to board 12 and passing through the center or major apertures of the cores.

At the near or input end of unit 10 are three upstanding electrical terminal posts 24, 26 and 28 rigidly fixed to board 12. These posts comprise the input connections to the unit for various drive currents supplied from an external power source (not shown) during operation of the unit. Immediately behind these electrical posts are three insulating pins 30, 32 and 34 which serve to support the near ends of the drive windings on the cores. A similar set of insulating pins 36, 38 and 40 is positioned at the far end of the core assembly, and near the rear edge of board 12 are three conductive posts 42, 44 and 46. The latter are normally shorted together by a conductor 48.

Figure 3:
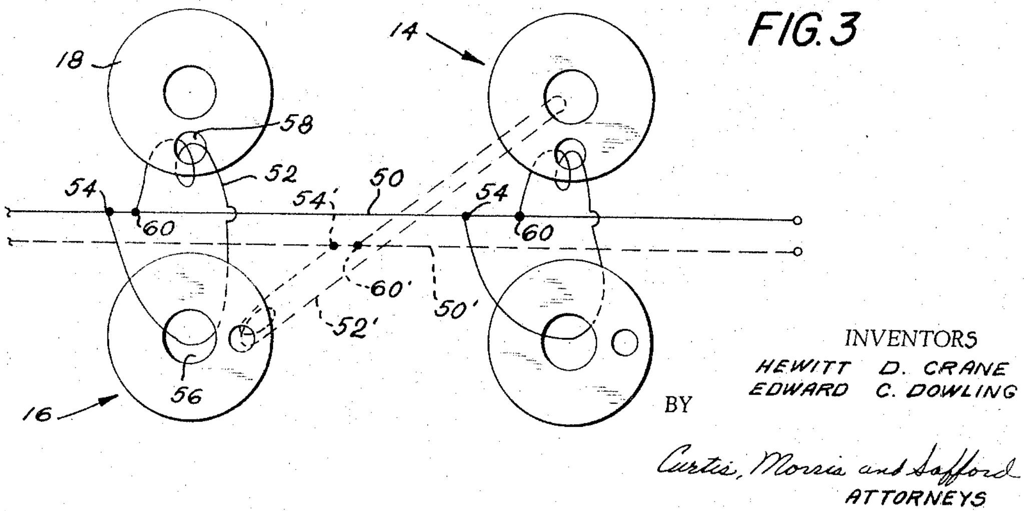
FIGURE 3 is a partial schematic diagram of the coupling loops of the unit shown in FIGURE 1.

Mounted along the lengthwise center line of unit 10 closely above the cores is a buss or heavy gauge wire conductor 50, the left end of the buss being clinched around post 32, and the right end around post 38. Connected for example by soldering, to buss 50 at evenly spaced intervals are a number of short wires 52. These are of equal length, and as seen in FIGURE 1, are initially connected at one end to buss 50 at points 54 while their other end is free. Each wire 52 is thereafter threaded (see FIGURE 3) through a receiving major aperture 56 of a core in column 16, thence through a transmitting minor aperture 58 of an adjacent core in column 14, and is then connected at its outer end at a point 60, adjacent point 54, to buss 50. Corresponding coupling loops between a transmitting aperture of a core in column 16 and a receiving aperture of the next core in column 14 are formed as indicated by the dotted lines in FIGURE 3, by a buss 50' and wires 52' which are positioned on the underside of the unit 10 seen in FIGURE 1.

Figure 2:
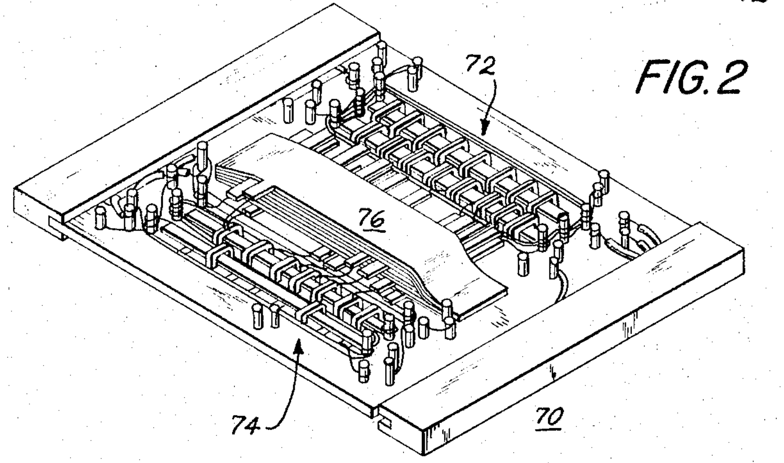
FIGURE 2 is a perspective view of a MAD core assembly wherein two circuits are connected in parallel by coupling loops comprised in part by flat sheets of copper.

FIGURE 2 is a perspective view of a logic circuit 70 also embodying the invention. Here a first group of MAD cores generally indicated at 72, are arranged as a shift register of the kind generally described in the above-mentioned patent. Information from the E cores of this group is to be shifted sidewise to a group of cores, generally indicated at 74, which perform certain logical functions, such as AND, OR, etc. The two groups 72 and 74 are interconnected by a modified "pig-tail" coupling loop assembly 76. The latter includes a number of copper sheet members, the actual shapes of which are shown in FIGURES 5–10, stacked one upon another, being separated by thin layers of insulation. This assembly 76 accomplishes the interconnection of group 72 with group 74, which would otherwise be impossible using conventional coupling loops.

Figure 4:
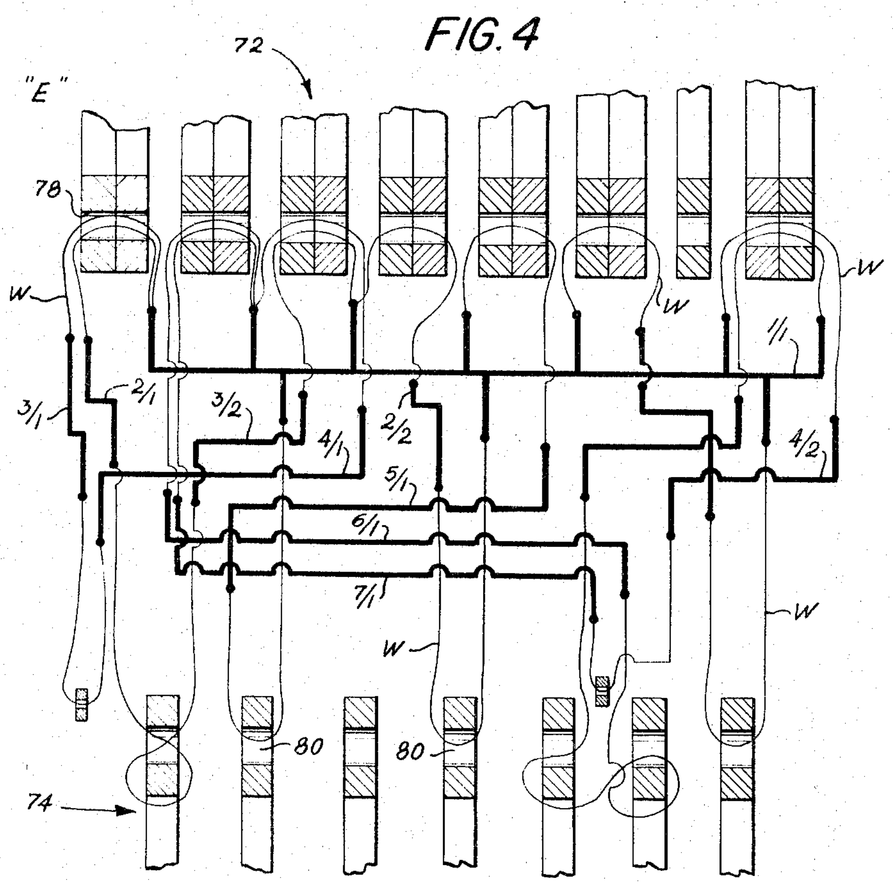
FIGURE 4 is a similar circuit diagram of the coupling loops of the unit shown in FIGURE 2.
Figure 5:
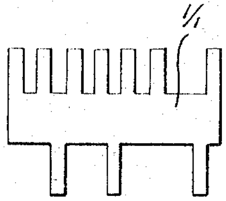
FIGURES 5–10 are actual shapes of the copper sheets used in the coupling loops of the unit in FIGURES 2 and 4.
Figure 6:
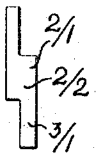
Figure 7:
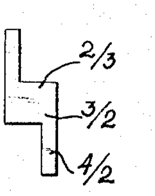
Figure 8:
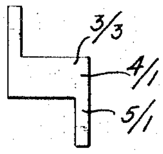
Figure 9:
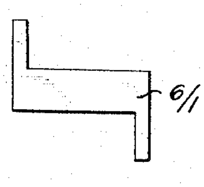
Figure 10:
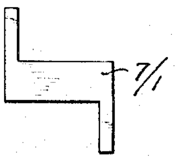

As seen in FIGURE 4, the E cores in group 72 are connected by means of wires threading their minor output apertures 78, with respective cores in group 74. A first portion of assembly 76 comprises a flat strip conductor 1/1, the actual shape of which is shown in FIGURE 5. This conductor has seven ears or tabs extending upward and three downward. Fine wires W are attached to the ends of respective ones of these tabs, and of others to be described. These wires thread apertures 78 of the E cores and apertures 80 of certain cores in group 74. Superimposed on the first strip in a second layer and insulated from it are two flat conductors 2/1 and 2/2, shown in FIGURE 6, and a flat conductor 2/3 shown in FIGURE 7. Similarly, a third layer is formed of a conductor 3/1 (identical in shape to conductor 2/1,), a conductor 3/2 (FIGURE 7), and a conductor 3/3 shown in FIGURE 8. A fourth layer consists of a conductor 4/1 (FIGURE 8), and a conductor 4/2 (FIGURE 7). The single conductor 5/1 in a fifth layer is shaped as shown in FIGURE 8. The single member 6/1 of the sixth layer is shown in FIGURE 9 while the single member 7/1 of the seventh layer is shown in FIGURE 10.

The coupling loops for each of the seven layers described above are completed by respective ones of the fine wires W which are soldered to the ends of the tabs of the various flat strip conductors 1/1–7/1. The lengths of the respective tabs of the flat strips and of wires W are proportioned so that the coupling loop impedances between the various cores have the desired values.

The above description of the invention is intended in illusrtation and not in limitation thereof. Various changes in the embodiments described may occur to those skilled in the art and these can be made without departing from the spirit or scope of the invention as set forth.

What is claimed is.

1. An improved magnetic core circuit comprising a plurality of magnetic cores arranged to shift information from one core to the next, one core being connected to transmit information to the next and so on, drive means for energizing said cores, and means for coupling one core to the next and so on, said means including a main heavy-gage conductor and auxiliary conductors each including at least a portion of fine wire threading an aperture of one core and an aperture of another core, the two ends of each said auxiliary conductor being connected to said main conductor to complete a coupling loop between cores.

2. The arrangement in claim 1 wherein said cores are arranged in two parallel groups, said main conductor being positioned between said groups and running axially along them.

3. The arrangement in claim 2 wherein said main conductor is a buss wire and each said auxiliary conductor is a pig-tail wire threading said cores with its two ends connected to said buss wire at closely adjacent points, there being a plurality of said pig-tail wires evenly spaced along said buss.

4. The arrangement in claim 2 wherein said main conductor is a flat sheet conductor having tabs extending outward from it and to which each said auxiliary conductor is connected.

5. The arrangement in claim 4 wherein there are a plurality of auxiliary conductors connected to said main flat sheet, at least some of said auxiliary conductors including secondary flat conductors stacked upon the main one.

6. A magnetic core assembly comprising a plurality of magnetic cores arranged in two parallel groups, drive winding means threading said cores to provide energizing currents thereto for advancing information from one core to the next and so on, and coupling winding means connecting one core to the next, said winding means including a large center conductor and auxiliary conductors connected thereto, each of said auxiliary conductors comprising a portion of fine wire threading respective apertures of two said cores, said auxiliary conductors each being connected to said center conductor in closed conductive loops.

7. A magnetic core shift register of the character described, said register including a plurality of magnetic cores arranged in a shifting sequence, drive means for advancing information from one core to the next and so on, and a plurality of individual coupling windings, each threading apertures of a respective pair of cores to transmit information from one core to the next, said windings comprising a main structural element which is conductive at least along portions of its length, and a plurality of fine wires connected in closed loops to said main element, each respective conductive portion of said main elemnt completing a conductive loop of each said coupling winding.

References Cited by the Examiner

UNITED STATES PATENTS

| | | | |
|---|---|---|---|
| 2,700,150 | 1/1955 | Wasles | 340—174 |
| 2,778,977 | 1/1957 | Lubin | 340—174 |
| 2,912,677 | 11/1959 | Ashenhurst | 340—170 |
| 2,923,553 | 2/1960 | Schultz et al. | 340—174 |
| 2,961,745 | 11/1960 | Smith | 29—155.5 |
| 2,985,948 | 5/1961 | Peters | 29—155.5 |
| 2,995,731 | 8/1961 | Sweeny | 340—174 |

JAMES W. MOFFITT, *Acting Primary Examiner.*

G. LIEBERSTEIN, *Assistant Examiner.*